Feb. 26, 1935.   J. J. MOJONNIER   1,992,712
WRAPPED FROZEN COMESTIBLE
Filed June 4, 1934
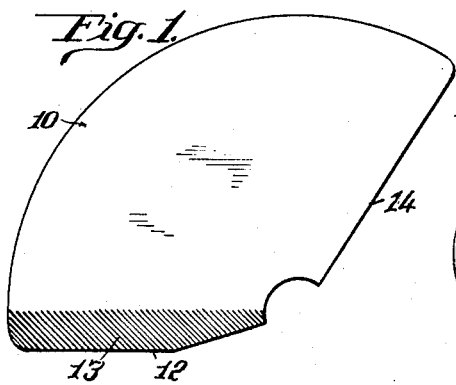
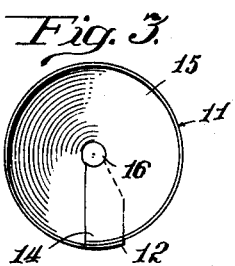
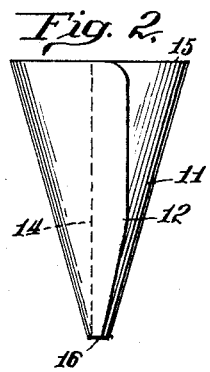
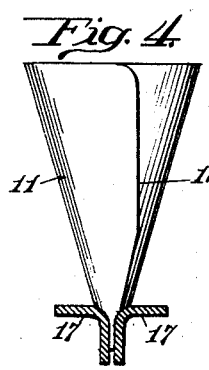
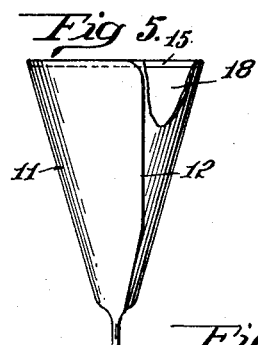
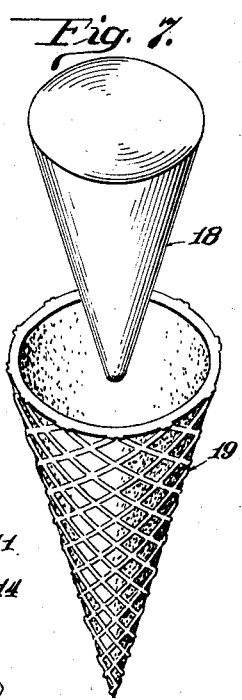
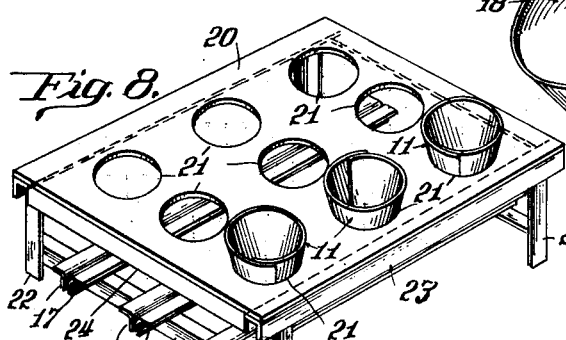
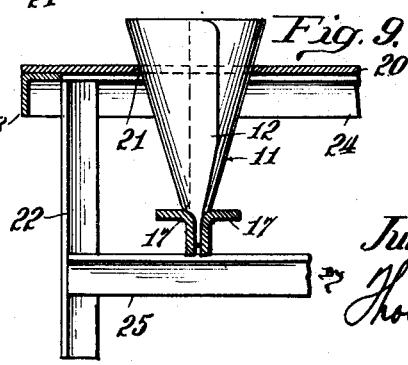
Inventor
Julius J. Mojonnier
By Thomas H. Ferguson
Attorney Patented Feb. 26, 1935

1,992,712

UNITED STATES PATENT OFFICE 1,992,712

WRAPPED FROZEN COMESTIBLE

Julius J. Mojonnier, Oak Park, Ill., assignor to Mojonnier Bros. Co., a corporation of Illinois Application June 4, 1934, Serial No. 728,889

5 Claims. (Cl. 107—8)

The present invention relates to wrapped frozen comestibles, preferably produced in conical form, a cone of the frozen comestible being contained in a closely fitting conically shaped wrapper of flexible infrangible sheet material. The flexible wrapper has an open pointed end which is pinched shut and so held during the filling of the wrapper with the partially frozen comestible and subsequently during the hardening period. When the comestible is frozen hard then the pinching hold upon the end of the wrapper may be released and the hard wrapped cone of frozen comestible is the result.

The invention resides in the method of handling the open ended cone to fill it and produce the wrapped frozen product and also in the apparatus employed to hold the cones and pinch their ends together to close them.

The principal object of the invention is to produce a wrapped frozen comestible of the class mentioned which may be quickly unwrapped so as to remove the covering cone from the cone of frozen comestible. By employing a conical wrapper having an open end at the apex of the cone and then pinching that end shut during filling and hardening periods, a product results wherein the wrapper is left adhering to the conical core of the frozen comestible and adhering in such a way that it can be quickly and easily removed.

In prior art cups and wrappers of conical shape it is usual to have an extra fold which must be released and turned back before beginning to unwrap the container from the frozen comestible within. According to the present invention there is no such extra flap or fold of the material which must be turned back. Therefore, at least one less operation is required in removing the new wrapper from its frozen edible core than is required in prior art containers of similar construction. Thus, the new wrapper may be removed by the customer with a minimum of effort and in a minimum of time.

Another object of the invention is to provide a novel tray or carrier for the open ended conical wrappers by which the pointed open ends of the wrappers will be pinched shut at the time the wrappers are placed in the tray.

Still another object is to provide for suitable sanitation in the production and handling of the new product.

These and other objects, features and advantages of the invention will be more fully understood upon reference to the following detailed description, taken in connection with the accompanying drawing, while the scope of the invention will be particularly pointed out in the appended claims.

In said drawing, Fig. 1 is a plan view of a blank out of which the open ended wrapper employed in the present invention is made. Fig. 2 is a side elevation of an open ended wrapper produced from the blank of Fig. 1. Fig. 3 is an inverted plan view of the wrapper of Fig. 2 illustrating especially the small apical open end. Fig. 4 is an elevation illustrating the lower open end of the wrapper closed by forcing it between two parallel pinching or closing bars. Fig. 5 is an elevational view of the same closed wrapper but taken after it has been filled and its contents frozen hard and after the wrapped frozen comestible has been taken from the pinch bars of Fig. 4. Fig. 6 is a perspective view illustrating the wrapped frozen comestible in conical form with a portion of the wrapper removed illustrating how the latter can be pulled away from the core of frozen comestible. Fig. 7 illustrates the manner in which the removed frozen comestible in conical form may be slipped into an edible cone of cake material or the like for serving to the customer. Fig. 8 is a perspective view of a tray for holding a number of open ended wrappers and provided with pinching bars for closing their lower ends, the tray being used while the partially frozen comestible is filled into the wrappers and subsequently hardened therein. And Fig. 9 is a partial elevational view of a portion of the tray of Fig. 8 illustrating the pinching bars and the upper plate member which engages the upper portion of the wrapper to hold the same in upright position in the tray. Throughout these views like characters refer to like parts.

In said drawing, 10 designates the segmental blank or flexible sheet material which is turned up into cornucopia form to produce the open ended wrapper 11 of Fig. 2. The blank may be variously shaped and variously turned in order to produce the wrapper 11. In the present instance the blank is of quadrantal form and along the edge 12 is provided with adhesive 13, shown by the parallel inclined lines. In forming the conical wrapper, the edge 12, bearing the adhesive, is lapped over the edge 14, and the adhesive holds the two edges together. The result is the conical wrapper 11.

The manufacture of wrappers having conical form with a large open mouth at one end and a small opening at the other is well known. Such conical wrappers may be used for different purposes. An example will be found in the liner illustrated in United States Patent No. 1,543,174, granted June 23, 1925, to J. B. Mattson.

The cone 11, resulting from the turning up of the blank 10, has a large open mouth 15 at its large end and a small opening 16 at its small end. The sheet material from which the blank is cut may vary considerably in its character. Commonly it is a thin waxed or paraffined paper.

In carrying out the method of the present invention, the wrapping cone 11 is closed at its lower end by pressing the walls of the material adjacent to the opening 16 together in the manner illustrated in Fig. 4 wherein the parallel pinch bars 17 provide a throat or mouth into which the open end of the wrapper is thrust with sufficient force to bring the opposing sides of the wall of the wrapper together to form a closure for that end of the wrapper.

While the wrapper is thus closed at its small end, the comestible in partially frozen condition is poured into the open end 15 of the wrapper until the wrapper is substantially filled. Then, the filled wrapper is placed in a hardening room or other place of low temperature sufficient to freeze the comestible to the desired hardness. When this point is reached, then the wrapper 11 will adhere to the frozen comestible, as indicated in Figs. 5 and 6, wherein the comestible 18 is shown in conical form determined and defined by the shape of the conical wrapper 11. Obviously, when the comestible 18 is sufficiently hardened, the same, together with its inclosing wrapper 11, may be withdrawn from the bars 17 which exert the pinching action upon the lower end of the wrapper 11. This is the condition illustrated in Fig. 5.

When thus hardened, the wrapped cone may be shipped to the retailer in a suitably cooled container and there sold to the customer. If desired, the wrapped frozen comestible may be taken by the customer to his home in the form illustrated in Fig. 5 and be served there. On the other hand, the customer may wish to enjoy the confection at the point of delivery, and, in such case, the frozen conical comestible 18 may be removed from its wrapper and placed in a suitable edible cone 19. These two elements, which go to make up the product for immediate consumption, are illustrated in Fig. 7, where the frozen commodity cone 18 is positioned directly above the edible cone 19 into which it is to be inserted for consumption by the purchaser.

Obviously, in removing the flexible covering constituting the conical wrapper 11, it will not be necessary to turn back any of the material of the covering at the small end of the cone but the same may be loosened at its edges 12 and 14 and the one edge, as the edge 12, pulled away from the other edge and from the cone of comestible 18 and the pulling action continued until the cone is left free of its wrapper, as shown in Fig. 7. In other words, in order to remove the wrapper it is only necessary to separate the edges 12 and 14 and draw off the wrapping material from the frozen core which it surrounds.

Since it is usual to fill containers with partially frozen ice cream, or other comestible, from machines designed for that purpose, and to fill a number of them at a time, it is desirable to arrange the pinching bars 17 in the form of a tray, such, for example, as illustrated in Fig. 8. Besides having the bars 17, which serve to close the small ends of the wrappers, the tray is preferably provided with a plate or support 20 positioned above the bars 17 and substantially parallel thereto, and to give this plate a series of openings 21 which shall be in alignment with their centers directly above the space between the bars 17, there being one set of openings 21 for each set of bars. In the present instance there are three sets of bars and three sets of openings illustrated. The apertured plate 20 thus provides walls or engaging portions which contact with the wrappers 11 well up toward their open ends 15. The support thus given near the upper ends of the wrappers serves with the support given by the bars 17 to maintain the wrappers 11 in upright position for receiving the partially frozen comestible. When the wrappers within the tray are completely filled, then the filled tray will be taken from the point of filling to the low temperature room where the hardening of the comestible is accomplished.

The tray elements, just mentioned, may be variously supported. In the present instance there are four legs 22 secured at their upper ends to side frame members 23 which engage the under side edges of the plate 20. For stiffening purposes, the plate 20 is also provided with end bars 24. The pinch bars 17 are supported in the present instance upon transverse bars 25 which are secured at their ends to the legs 22 at the opposite ends of the tray. If desired, additional cross members supported from the frame bars 23 may also be employed to still more firmly hold the pinch bars 17. Ordinarily, the various frame members, including the legs and cross bars, may be composed of simple angle irons and the various parts may be spot welded together. Of course, this is only illustrative and other ways of securing the parts together may be employed if desired.

Obviously the plate 20 might give way to other forms of supports for the upper portions of the conical wrappers 11. It will also be apparent that other ways of pinching the open ends 16 to close the wrappers may be employed. Indeed, attachments for this purpose might be affixed at the time the wrappers are placed for filling with the partially frozen comestible. It will be apparent also that other changes might be made and the wrapper itself might take different forms. All of these matters, however, should come within the scope of the appended claims which are drawn with a view to covering all alterations and modifications which rightly come within the spirit and scope of the invention.

Obviously, when the partially frozen comestible is flowed into the wrapping cone 11, it will completely fill all the empty space therein and assume a form like that of the wrapping cone which serves as a mold for it, and it is in this mold that the comestible is completely hardened. In the actual forming of the wrapping cones, the material out of which the blanks 10 are formed is very thin being commonly a paraffined sheet of very thin paper. Consequently, the molded comestible when it leaves the molding wrapper cone has a smooth exterior surface. This could hardly be the case if the material of the wrapper were as thick as shown in the drawing but in practice such is not the fact. In the drawing the thickness of the sheet material is necessarily exaggerated in order to show how the edges 12 and 14 overlap. In other words, the thickness of the sheet material of the cone 11 is exaggerated for the sake of clearness. The resulting frozen cone 18 is shown as it appears in practice and not seamed or roughened as it would appear were thick material such as the exaggeration shows used.

I claim:

1. A tray for pinching the open ends of open ended wrapping cones of flexible infrangible sheet material comprising means for engaging the upper portions of said wrapping cones and separated bars beneath said means for engaging the open lower ends of said cones to pinch them shut when forced between said bars.

2. A tray for holding and pinching shut the open lower ends of wrapping cones of flexible sheet material comprising a supporting member having a plurality of aligned openings into which the wrapping cones may be inserted, said member engaging the cones near their larger ends to support them in alignment against lateral movement, and aligned means beneath said openings for engaging the small open ends of said cones and pinching them shut so as to receive and hold a frozen commodity therein.

3. A tray for holding and pinching shut the open lower ends of wrapping cones of flexible sheet material comprising a supporting member having a plurality of aligned openings into which the wrapping cones may be inserted, said member engaging the cones near their larger ends to support them in alignment against lateral movement, and slightly separated parallel bars beneath said openings for engaging the small open ends of said cones and pinching said ends shut and maintaining them so for the purpose of receiving and holding a partially frozen comestible during hardening in an atmosphere of low temperature.

4. A device for closing the open end of an open ended wrapping cone of flexible infrangible sheet material comprising means for engaging and supporting the upper portion of said wrapping cone, and additional means beneath said first mentioned means for closing the open end of said cone, said additional means comprising fixed elements for engaging the sheet material of the open ended cone to press the material together to close the open end.

5. A device for closing the open end of an open ended wrapping cone of flexible infrangible sheet material comprising means for peripherally contacting the upper portion of said wrapping cone, and additional means beneath said first mentioned means for closing the open end of said cone, said additional means comprising elements for pinching the material of the cone to shut its lower open end.

JULIUS J. MOJONNIER.